United States Patent [19]

Johnson et al.

[11] 4,433,396
[45] Feb. 21, 1984

[54] SONAR RECEIVERS

[75] Inventors: Phillip L. M. Johnson; John R. Walden, both of Somerset, England

[73] Assignee: Plessey Overseas Limited, Ilford, England

[21] Appl. No.: 300,128

[22] Filed: Sep. 8, 1981

[30] Foreign Application Priority Data

Sep. 10, 1980 [GB] United Kingdom ............... 8029193

[51] Int. Cl.³ .......................... G01S 7/54; G01S 15/42
[52] U.S. Cl. .................................. 367/105; 310/335; 367/122; 367/151
[58] Field of Search ...................... 367/105, 151, 122; 310/335; 179/1 DM, 1 MF

[56] References Cited

U.S. PATENT DOCUMENTS 3,243,768 3/1966 Roshon, Jr. et al. ........... 310/335 X
3,389,372 6/1968 Halliday et al. ................ 367/151 X

FOREIGN PATENT DOCUMENTS 317089 10/1930 United Kingdom .

Primary Examiner—Richard A. Farley
Attorney, Agent, or Firm—Fleit, Jacobson, Cohn & Price

[57] ABSTRACT

A sonar receiver comprises an inwardly curved reflector arranged to direct received sonar signals onto a transducer system. The transducer system comprises an array of transducers distributed over an inwardly curved path facing the reflector. Each transducer is responsive to sonar signals received from a particular direction to provide an output signal indicative of a reflecting object, the amplitude of which signal is related to distance of the reflecting object.

16 Claims, 4 Drawing Figures

SONAR RECEIVERS

This invention relates to sonar receivers and more particularly to reflective sonar receivers.

One of the complexities which add to the cost of sonar systems is the requirement for a beamformer which determines, from received sonar signals, information relating to range and direction of the reflected signal. This determination normally requires complex evaluating circuitry. The present invention seeks to provide a simplified sonar receiver.

According to the invention there is provided a sonar receiver, comprising an inwardly curved reflector arranged to direct received sonar signals onto a transducer system, which transducer system comprises an array of transducers distributed over an inwardly curved path facing the reflector such that each transducer is responsive to sonar signals received from a particular direction to provide an output signal indicative of a reflecting object the amplitude of which signal is related to distance of the reflecting object, and sequential selection means arranged to couple the outputs of the transducers sequentially to a display device for indicating in response to a signal the direction and distance of a reflecting object.

Preferably each transducer is directed towards the centre of the reflector but slight divergence from the centre is acceptable. The curved path is preferably substantially compliant with the locus of the focus of all possible object positions at a given range. However, the curved path can diverge from this locus provided it remains within the depth of field of the reflector within the intended operating range. In one advantageous form the reflector is elliptical.

Another possibility is that the reflector may be of constant radius. In this case the radius of the transducer may be equal to half the radius of curvature of the reflector measured at its centre.

The transducers of the array may be mounted on individual resilient mounts. This mounting reduces or eliminates cross coupling between elements and therefore beams. The resilient mountings may be formed by pressure release rubber. The transducer and mount assemblies may be secured between two layers of flexible material with the transducers secured to one of the layers, which is transparent to sonar radiation, and the mounts secured to the other of the layers.

The transducer assembly is preferably mounted in an open sided housing which is shaped to corresond to the curved path and to support the assembly such that the transducer faces are positioned along the path. Preferably, said one layer is arranged to seal the open side of the housing.

In order that the invention and its various other preferred features may be understood more easily, an embodiment thereof will now be described, by way of example only, with reference to the drawings in which.

Figure 1:
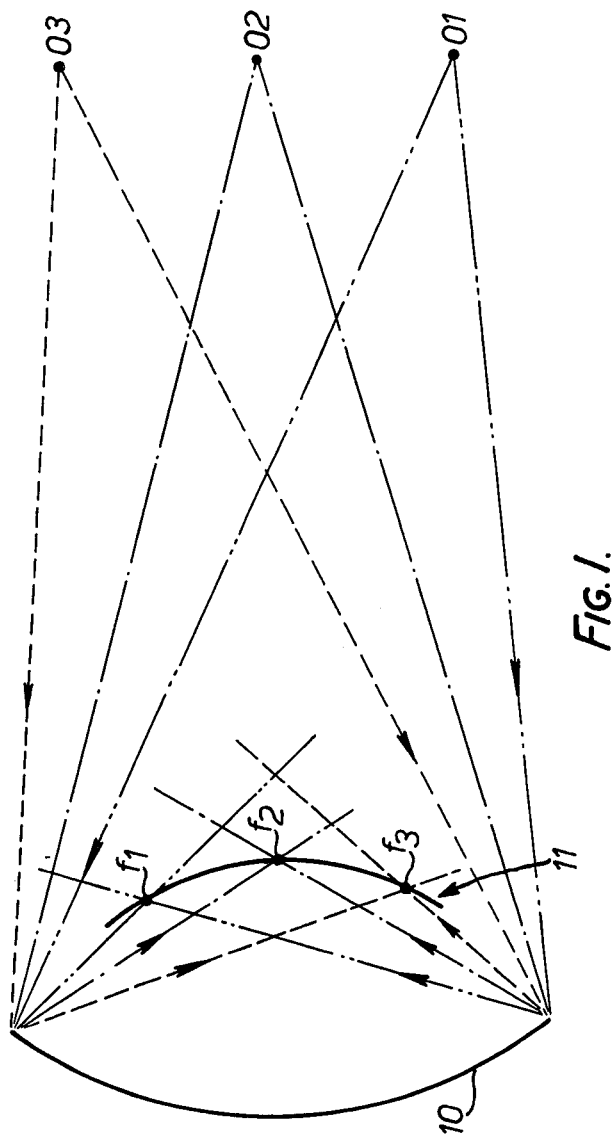
FIG. 1 is a diagram showing the focusing effect of an inwardly curved reflector.

In FIG. 1 a reflector 10 has a reflecting surface which is inwardly curved in one plane and which may be of the form of an ellipse. The diagram illustrates the path of radiation reflected from an object positioned at three positions 01, 02, 03, at a constant distance from the mirror, to the mirror and the reflection of that radiation to points of focus f1, f2, f3. If sufficient points were taken, then due to the curvature of the reflector, the locus of the focus of all possible object positions at that given range would define a path 11 that is inwardly curved and which faces the reflector. It will be appreciated that each object position 01, 02, 03, at that given distance will be focused at a unique position on the curved path so that if we arrange for a transducer to be located at this position it would respond only to sonar radiation arriving from the direction of the object and variation of the object distance within a predetermined operating range will result in variation of the amplitude of the transducer signal as a function of the object distance. Accordingly, the presence of an output signal on the transducer indicates the presence of a sonar reflecting object in a given direction and the amplitude of that signal can be used to indicate its target strength. The present invention is based on this realisation and employs an array of transducers distributed over the path so that the direction of a sonar reflecting object is indicated in dependence upon which of the transducers is excited. The array effectively provides a beam former sampling system which does not require complex electronics to resolve bearing and distance information.

Figure 2:
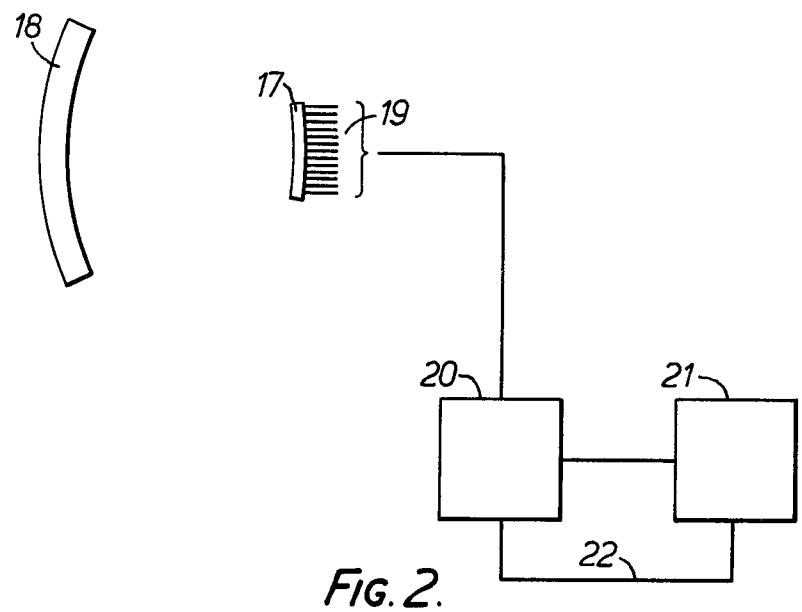
FIG. 2 is a schematic illustration of a sonar receiver constructed in accordance with the invention.
Figure 3:
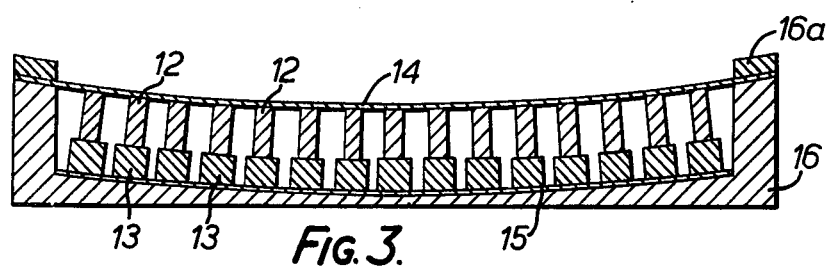
FIG. 3 is a cross sectional view of the transducer system of the receiver of FIG. 2; and, FIG. 4 is a plan view of the transducer system of FIG. 2.
Figure 4:
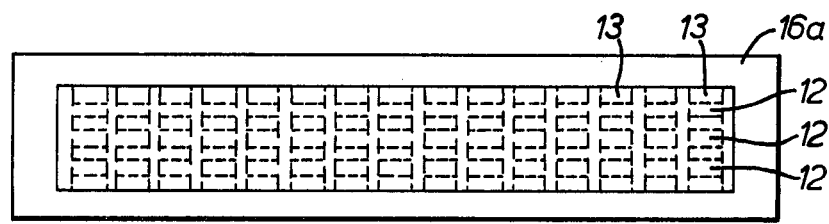

The schematic diagram of a sonar receiver constructed in accordance with the invention is illustrated in FIG. 2 and employs a transducer system as is illustrated in FIGS. 3 and 4. The transducer system comprises fifteen rows of three piezoelectric transducer elements 12. As can be seen from FIG. 4 the transducers in the rows are in alignment and each group of three, forming each row, are mounted on a common mount 13 which is formed by a block of pressure release rubber. The transducer/mount assemblies are spaced equidistantly one from another and are secured by adhesive between two thin sheets 14, 15 of flexible material e.g. rubber or polyurethane so that all the transducers are stuck to one sheet 14 and all the mounts to the other sheet 15. The sheet 14 must be substantially transparent to sonar signals and forms an acoustic window. The assembly so produced is very flexible and is mounted inside a hollow aluminium housing 16 having internal dimensions sized to accept the transducer assembly. The housing is a substantially rectangular shape open on one side and having the perimeter of the opening shaped to comply substantially with the curved path corresponding to the locus of the focus of all possible object positions at a given range of a reflector with which the transducer will be used. The inside base of the housing is also shaped to this path. The layer 15 is considerably more compliant than the layer 14 so that under increased hydrostatic pressure the layer 15 will deform significantly more than layer 14 thereby retaining the design curvature of layer 14. The transducer assembly is introduced into the housing whereupon the two sheets conform to the shape of the curved path. The sheet 14 overlaps the perimeter of the housing and is secured thereto by a clamping plate 16a so that the housing is effectively sealed and contains air. It will be appreciated that the transducers are thereby positioned on the required path. The described transducer system is identified as 17 in FIG. 2 and is mounted at the focus of a sonar reflection 18 of elliptical configuration with which it is desired to operate.

The outputs 19 of the transducers are coupled each to a particular input of a sequential selector 20 the output of which is coupled to a display device 21 e.g. a C.R.T. display for displaying direction on the X axis and distance on the Y axis. The sequential selector is synchronised with a display scan by means of the synchronising connection 22 so that the transducer outputs are coupled sequentially to the display during each scan and in synchronism with the scan. The occurence of a signal is then indicated by a line on the display the position of the line on the X axis indicating the direction of the sonar reflecting objects and the length of the line indicating on the Y axis the distance.

It is not essential for the transducers to be mounted on a path that conforms exactly with the calculated locus of the focus points provided they are positioned within the depth of focus of the reflector at the intended operating range. In practice it is convenient to make the reflector elliptical and to mount the transducers on a curved path of constant radius. The radius can be made equal to half the radius of curvature of the reflector measured at its centre. The mounting of the transducers on separate blocks of pressure released rubber is beneficial in that it reduces interaction between transducers by mechanical coupling.

It will be understood that the above description of the present invention is susceptible to various modifications, changes and adaptations.

We claim:

1. A sonar receiver, comprising an inwardly curved reflector arranged to direct received sonar signals onto a transducer system, which transducer system comprises an array of transducers distributed over an inwardly curved path facing the reflector such that each transducer is directed towards the center of the reflector and is responsive to sonar signals received from a particular direction to provide an output signal, indicative of a reflecting object, the amplitude of which signal is related to distance of the reflecting object.

2. A sonar receiver as claimed in claim 1, including sequential selection means arranged to couple the outputs of the transducers sequentially to a display device for indicating, in response to a signal, the direction and distance of a reflecting object.

3. A sonar receiver as claimed in claim 1, wherein the curved path is substantially compliant with the locus of the focus of all possible object positions at a given range.

4. A sonar receiver as claimed in claim 1, wherein the reflector is elliptical.

5. A sonar receiver as claimed in 1, wherein the reflector is of constant radius.

6. A sonar receiver as claimed in claim 5, wherein the radius of the transducer array is equal to half the radius of curvature of the reflector measured at its centre.

7. A sonar receiver as claimed in claims 1, 2, 3, 4, 5 or 6, wherein the transducers of the array are mounted on individual resilient mounts.

8. A sonar receiver as claimed in claim 7, wherein the mounts are formed by pressure release rubber.

9. A sonar receiver as claimed in claim 8, wherein the transducers and mounts are secured between two layers of flexible material with the transducers secured to one of the layers, which is transparent to sonar radiation, and the mounts secured to the other of the layers.

10. A sonar receiver as claimed in claim 9, wherein said other layer of flexible material is more compliant than said one layer.

11. A sonar receiver as claimed in claim 9, wherein the transducer assembly is mounted in an open sided housing.

12. A sonar receiver as claimed in claim 11, wherein the housing is shaped to correspond to the curved path and to support the assembly such that the transducer faces are positioned along the path.

13. A sonar receiver as claimed in claim 11, wherein said one layer is arranged to seal the open side of the housing.

14. A sonar receiver as claimed in claim 13, wherein said one of the layers of flexible material overlaps the perimeter of the housing and is secured thereto so as to seal the housing with air contained therein.

15. A sonar receiver as claimed in claim 14, wherein the outputs of the transducers are coupled each to a particular input of a sequential selector the output of which is coupled to a display device arranged to display directional and distance information in dependance upon which transducer is responsive to a received signal.

16. A sonar receiver as claimed in claim 15, wherein the display device comprises a cathode ray tube display apparatus having a scan synchronised with the sequential selector and arranged to display directional information on one axis and distance information on its other axis.

* * * * *